Feb. 10, 1959     N. HORWOOD     2,873,104
FLUID GOVERNORS
Filed April 12, 1956
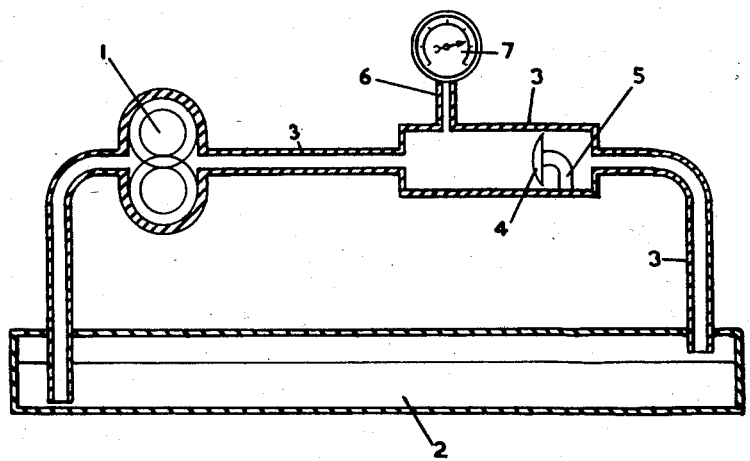

2,873,104

FLUID GOVERNORS

Norman Horwood, Birmingham, England, assignor to The Austin Motor Company Limited, Birmingham, England Application April 12, 1956, Serial No. 577,879

Claims priority, application Great Britain May 16, 1955

1 Claim. (Cl. 264—14)

This invention relates to fluid governors, that is to say governor devices which operate by fluid pressure, and has for its object a new or improved application of a fluid governor, for control or other purposes, to engine-driven machines or apparatus in which it is required to actuate one or more control valves or other elements in direct proportion with engine speed. In order to operate such control valves or other elements directly in accordance with engine speed, it is customary to employ centrifugally weighted or other mechanical engine-driven governors, but such mechanical devices are generally expensive and are limited in available operating forces and, therefore, a simple and comparatively cheap fluid governor having a relatively high direct operating force operated by an engine-driven pump of the positive displacement type is very desirable though this presents a problem in that, whereas the volumetric displacement of such an engine-driven pump will be approximately directly proportional to engine speed, the pump delivery pressure varies approximately in proportion to the square of the engine speed.

A fluid governor according to the present invention comprises a pressure-responsive variable restriction valve which is subjected to and actuated by the delivery pressure of an engine-driven pump of the positive displacement type and a static pressure tapping taken from the delivery side of the pump at a position upstream of the said variable restriction valve, and is characterised in that the pressure-responsive variable restriction valve comprises a flexible disc rigidly mounted at its centre concentrically within a circular pump delivery pipe which it controls or restricts, the periphery of said disc being free to distort or flex under the influence of pump delivery pressure in such manner that an annular space defined between said periphery and said delivery pipe increases progressively with pump delivery pressure but at a decreasing rate such as to maintain in said tapping a static pressure which will vary directly in proportion to engine speed. This static pressure can be utilised to actuate an engine speed indicator or other device which requires to operate in direct proportion to engine speed.

An example of a fluid governor or speed indicator according to the invention is illustrated diagrammatically in the accompanying drawings.

In the embodiment shown, an engine-driven pump 1 of the positive displacement gear type draws liquid from a reservoir 2 and returns it thereto by way of a delivery pipe 3, and the pump volumetric delivery, which varies approximately in proportion to engine speed, is utilised to operate a variable restriction valve 4 in the form of a flexible rubber or like disc rigidly mounted at its centre, by means of a stem 5, concentrically within an enlarged or cylindrical chambered portion of the delivery pipe 3 which it controls or restricts, whilst a small bore static tapping 6 taken off the delivery pipe 3 at a position between the pump outlet and the valve 4 is connected to the device 7, such for example as an engine speed indicator, which requires to be actuated directly in proportion to engine speed. The characteristic of the variable restriction valve or disc 4 is that its periphery is free to distort or flex under the influence of the pump delivery pressure in such manner that the annular space defined between said periphery and the delivery pipe 3 increases progressively with pump delivery pressure but the rate of increase of said valve opening or annular space decreases with increase of fluid pressure and is such as to maintain in the tapping 6 a static pressure which varies directly in proportion with engine speed. This characteristic of the valve disc 4 is attained by making it of progressively decreasing axial dimension or thickness from the centre to the periphery so that its flexibility increases in the radially outward direction, and the actual diametrical cross section of the valve disc 4 will, of course, be a matter of design and vary with the range of delivery pressures to be dealt with and the nature of the flexible material of which said valve disc is made.

It will be appreciated that a fluid governor or speed indicator as above described is of very simple and cheap construction as compared with centrifugally operated or other mechanical governors, and that the restriction valve, by virtue of its simple design, can be expected to be reliable in operation and not to become choked or blocked due to dirt or other causes; also the available operating force can be relatively high so that controls may be directly coupled to the governor, so dispensing with the need for extra servo assistance.

Having fully described my invention, what I claim and desire to secure by Letters Patent is:

A fluid governor or speed indicator comprising a pressure-responsive variable restriction valve, an engine-driven pump of the positive displacement type, said valve being subjected to and actuated by the delivery pressure of said pump, and a static pressure tapping taken from the delivery side of the pump at a position upstream of said variable restriction valve, wherein the pressure responsive variable restriction valve comprises a flexible disc rigidly mounted at its centre concentrically within a circular pump delivery pipe which it controls or restricts, said disc being of progressively decreasing axial thickness from the center to the periphery, the said periphery of said disc being free to distort or flex under the influence of pump delivery pressure in such manner that an annular space defined between said periphery and said delivery pipe increases progressively with pump delivery pressure but at a decreasing rate such as to maintain a static pressure in said tapping which varies directly with engine speed.

References Cited in the file of this patent

UNITED STATES PATENTS

| | | |
|---|---|---|
| 783,679 | Caille | Feb. 28, 1905 |
| 2,069,309 | Henszey | Feb. 2, 1937 |
| 2,489,932 | Rosenblum | Nov. 29, 1949 |
| 2,567,890 | Myklestad | Sept. 11, 1951 |
| 2,756,982 | Tuscher | July 31, 1956 |

FOREIGN PATENTS

| | | |
|---|---|---|
| 549,578 | Germany | Apr. 29, 1932 |
| 22,812 | Great Britain | May 30, 1907 |